United States Patent [19]
Wang

[11] Patent Number: 5,803,325
[45] Date of Patent: Sep. 8, 1998

[54] MULTIFUNCTIONAL ARTICLE REST BETWEEN TWO FRONT SEATS

[76] Inventor: Hsu-Yi Wang, No. 3, Lane 17, Jong-Jenq Street, Beei-Tour Chiu, Taipei, Taiwan

[21] Appl. No.: 636,368

[22] Filed: Apr. 23, 1996

[51] Int. Cl.$^6$ ..................................................... B60R 7/04
[52] U.S. Cl. ........................... 224/275; 224/572; 224/915
[58] Field of Search ..................................... 224/275, 572, 224/915; 296/37.8, 37.15

[56] References Cited

U.S. PATENT DOCUMENTS

| | | | |
|---|---|---|---|
| 5,004,134 | 4/1991 | Barry | 224/915 |
| 5,044,321 | 9/1991 | Selph | 224/275 X |
| 5,154,331 | 10/1992 | Sanders | 224/572 X |
| 5,226,576 | 7/1993 | Ellsworth | 224/572 |

FOREIGN PATENT DOCUMENTS

| | | | |
|---|---|---|---|
| 376153 | 7/1990 | European Pat. Off. | 224/275 |

*Primary Examiner*—Renee S. Luebke
*Attorney, Agent, or Firm*—Pro-Techtor International Services

[57] ABSTRACT

A multifunctional article holder adapted to rest between the two front seats of a car. The holder includes a main body and an independent mobile phone bag. The main body includes a facial tissue box container and a garbage collection bag associated with the container. The mobile phone is disposed with an article bag associated therewith. The mobile phone bag is detachably attached to the facial tissue box container by fastening belts. A cover flap is connected to one side of an upper opening of both the facial tissue box container and the garbage collection bag, so that the cover flap covers the openings. Two latch clips and extensible belts are disposed on outer sides of the container. A water collection cup is disposed on each extensible belt, whereby a handle of an umbrella can be held in the latch clip with a tip of the umbrella placed in the water collection cup to collect rain water. The latch clips also serve to hold other items. A fastening plate may be disposed on a rear face of the mobile phone bag and a corresponding fastening plate is disposed on an outer side of the facial tissue box container for attaching to the fastening plate of the mobile phone bag so as to detachably secure the mobile phone bag on the facial tissue box container.

3 Claims, 3 Drawing Sheets

MULTIFUNCTIONAL ARTICLE REST BETWEEN TWO FRONT SEATS

BACKGROUND OF THE INVENTION

The present invention relates to a multifunctional article holder adapted to rest between the two front seats of a car, and more particularly to an article holder not only adapted to receive articles, garbage, and mobile phones, but also widely used for holding a wet umbrella, cups or pens.

A conventional multifunctional article holder adapted to rest between the two front seats of a car includes four bags with different dimensions on the front face of the article holder. These bags are folded flat when not in use. In use, the bags are stretched open and secured to the main body of the article holder by fastening belts. The bags hold facial tissue, a mobile phone, a garbage bag, papers, etc.

Two fixing belts are disposed at two ends of an upper face of the main body. The fixing belts attach the article holder to the insertion columns of the movable headrest of the front seat. A lower extending belt is stitched at each end of a lower face of the main body to fixing article holder on the support frame of the front seat. The same bags are disposed in the back space of the article holder for passengers in the rear seat.

The above described conventional article holder provides convenience for the drive and passengers. However, the bags of the prior art article holder are open and thus are exposed. Therefore, the appearance of such an article holder is poor and the odor of the garbage discarded in the bags always spreads throughout the entire interior of the car. Moreover, generally, the bag for holding a mobile phone therein has an elongated shape suitable for receiving an elongated mobile phone. With respect to the currently widely used mini mobile phone, such an elongated bag is not practical as a user must extend his/her hand entirely into the elongated bag to reach the mobile phone.

SUMMARY OF THE INVENTION

It is therefore a primary object of the present invention to provide a multifunctional article holder adapted to rest between the two front seats of a car. The holder includes a main body and an independent mobile phone bag. The main body includes a facial tissue box container and a garbage collection bag associated with the container. The mobile phone is disposed with an article bag associated therewith. The mobile phone bag is detachably attached to the facial tissue box container by fastening belts. A cover flap is connected to one side of an upper opening of both the facial tissue box container and the garbage collection bag, so that the cover flap covers the openings.

Two latch clips and extensible belts are disposed on outer sides of the container. A water collection cup is disposed on each extensible belt, whereby a handle of an umbrella can be held in the latch clip with a tip of the umbrella placed in the water collection cup to collect rain water. The latch clips also serve to hold other items.

It is a further object of the present invention to provide the above article holder, in which a fastening plate is disposed on a rear face of the mobile phone bag and a corresponding fastening plate is disposed on an outer side of the facial tissue box container for attaching to the fastening plate of the mobile phone bag so as to detachably secure the mobile phone bag on the facial tissue box container.

The present invention can be best understood through the following description and accompanying drawings, wherein:

DETAILED DESCRIPTION OF THE PREFERRED EMBODIMENTS

Figure 1:
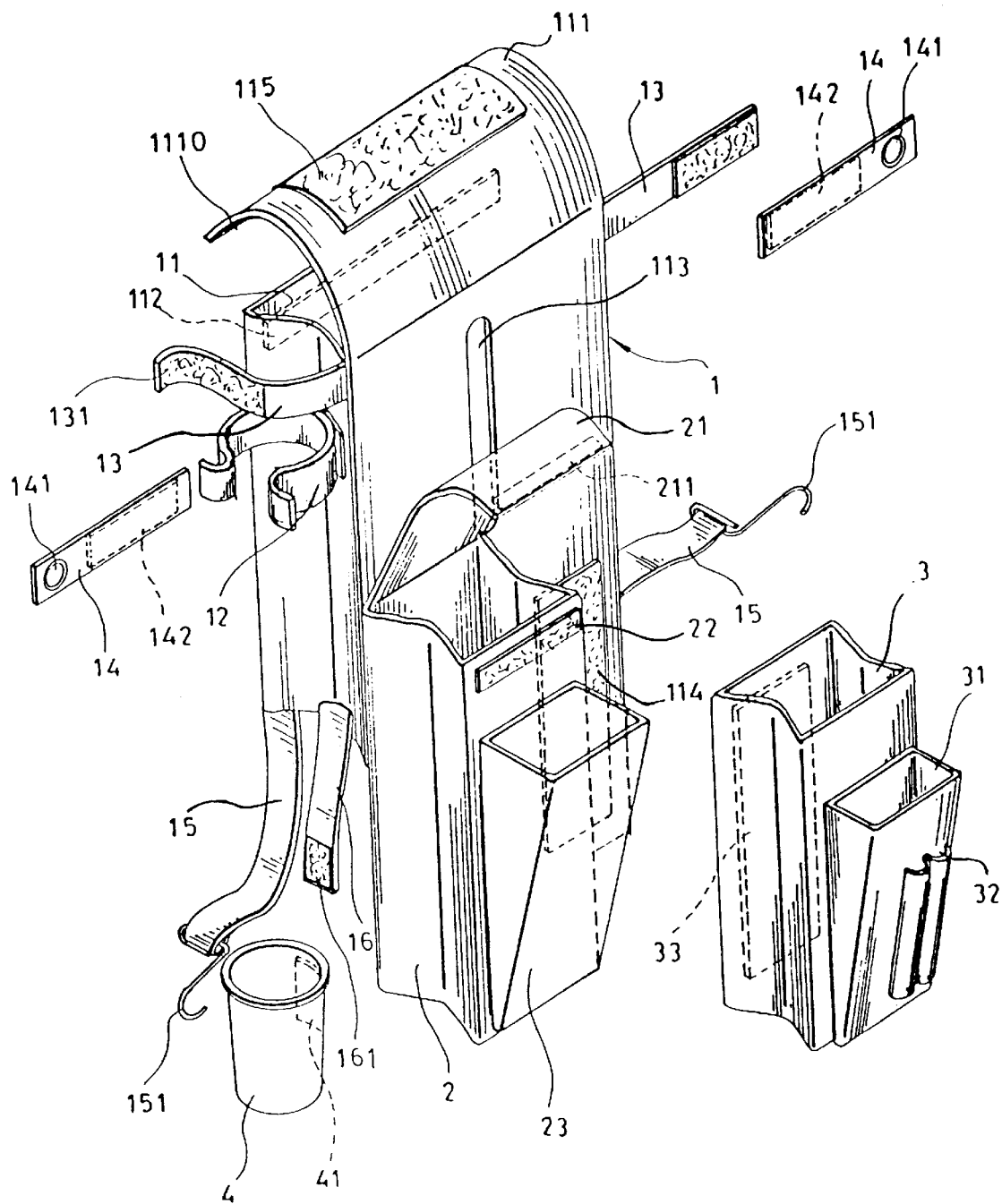
FIG. 1 is a perspective exploded view of the present invention.

Please refer to FIG. 1. According to a preferred embodiment of the present invention, the article holder comprises a main body 1 and an independent mobile phone bag 3. The main body 1 includes a facial tissue box container 11 and a garbage collection bag 2 associated with the container 11. A cover flap 111 is connected to one side of an open end of the container 11. A fastening plate 115 is disposed on an outer face of the cover plate 111 to receive articles having fastening belts.

A fastening belt is disposed on the end of an inner face of the cover flap 111, and another fastening belt 112 is disposed on the end of the outer face of the facial tissue box container 11. The fastening belt 110 can be attached to the fastening belt 112 so as to make the cover flap 111 close the container 11.

The front face of the container 11 is formed with a slot 113, whereby the facial tissue contained in the container 11 can be drawn through the slot 113. Two upper elastic belts 13 are disposed on an upper end of the container 11, and two lower elastic belts 15 are disposed on a lower end of the container 11.

In addition, a pair of independent subsidiary fastening belts 14 are provided. One end of each subsidiary fastening belt 14 is disposed with a fastening plate 142, and the other end is formed with a hole 141. The insertion column of the headrest of the car seat can be inserted through the hole 141. The fastening plate 142 and the fastening belt 131 of the upper elastic belt 13 can be attached to each other.

A latch hook 151 is disposed at a lower end of the lower elastic belt 15 and is attached to the support frame under the seat so as to secure the entire main body 1 of the article holder between the two front seats of the car. When it is desired to detach the main body 1 from the seat, the upper elastic belts 13 are detached from the subsidiary fastening belts 14 and then the latch hooks 151 are unlatched from the support frame under the seat.

Figure 2:
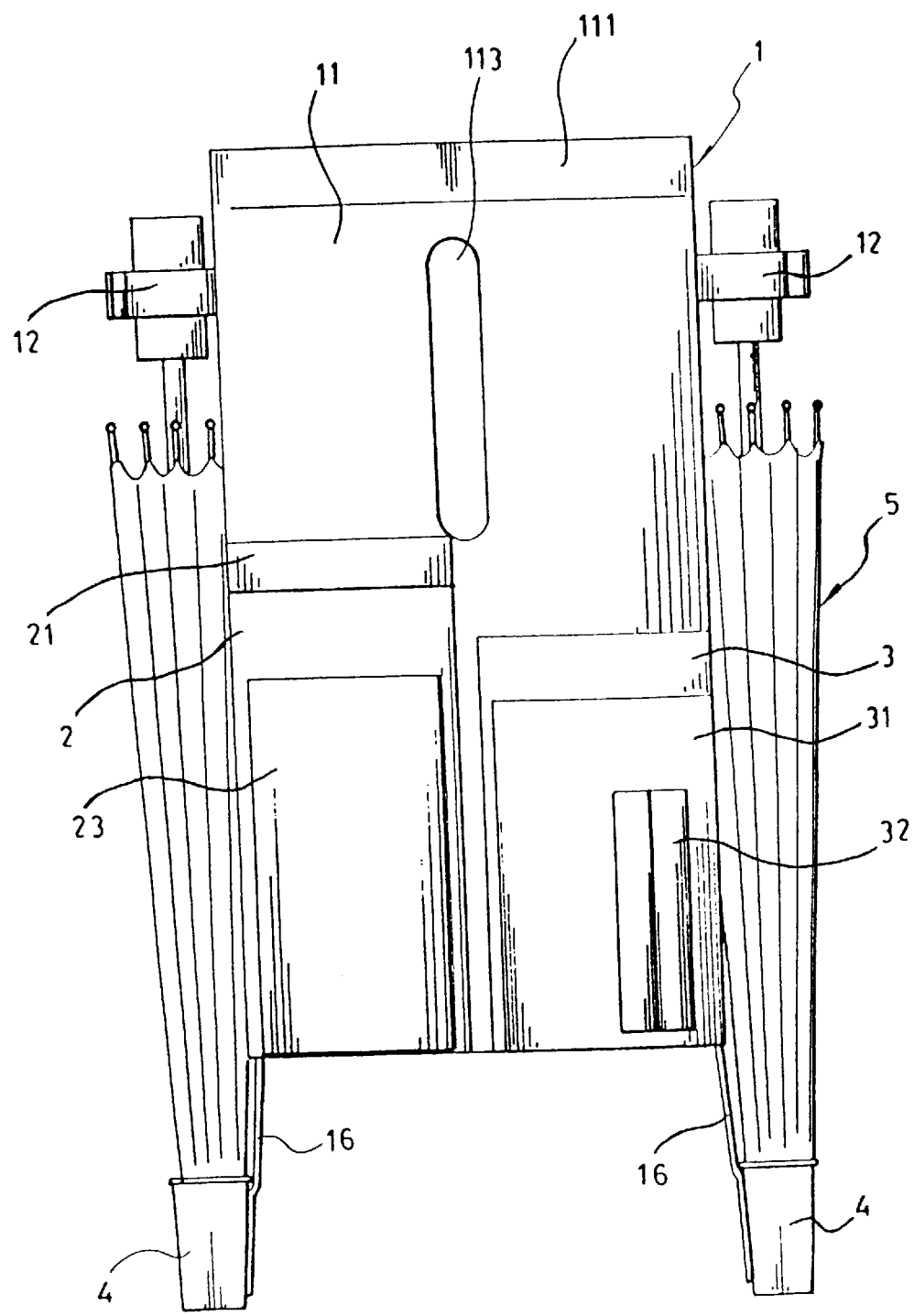
FIG. 2 is a front view of the present invention holding two umbrellas.
Figure 3:
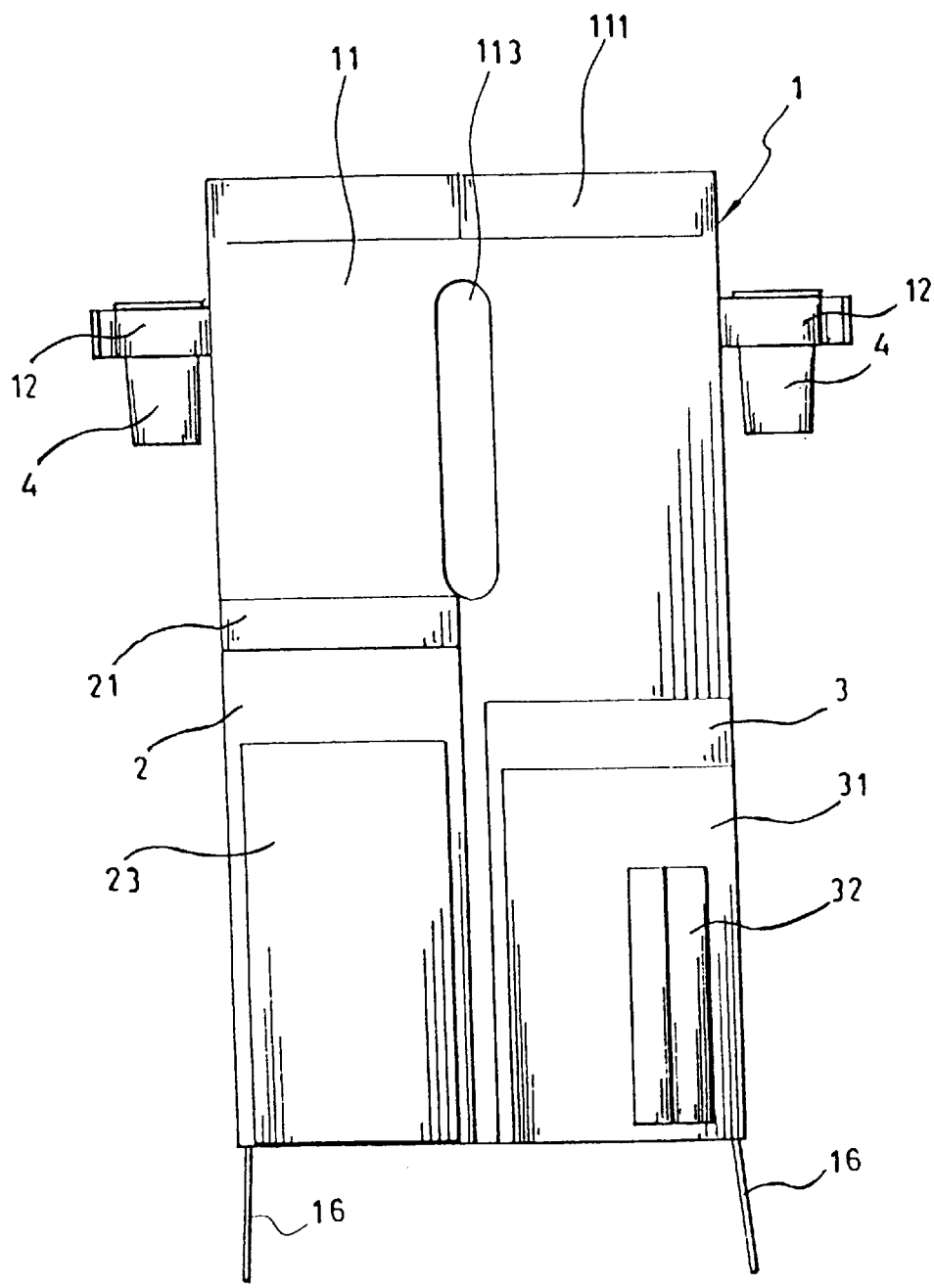
FIG. 3 is a front view of the present invention holding two cups.

A pair of latch clips 12 are respectively disposed on two sides of the upper portion of the container 1. A pair of extensible belts 13 are respectively disposed on two sides of the upper portion of the container 1. A pair of extensible belts 15 are respectively disposed on two sides of the lower portion of the container 1. A fastening belt 161 is disposed on each extensible belt 16. Two water collection cups 4 are further provided. A fastening belt 41 is disposed on an outer wall face of each water collection cup 4 to secure the cup 4 to the fastening belt 161 of the extensible belt 16. The handle of an umbrella 5 can be held in the latch clip 12 with the tip of the umbrella fitted in the water collection cup 4. By means of the latch clip 12 and the water collection cup 4, the umbrella 5 can be securely held without falling down as shown in FIG. 2. Rain water on the umbrella drops into the water collection cup 4 without wetting other articles in the car. When the umbrella is not in use the water collection cup 4 can be held in the latch clip 12 as shown in FIG. 3.

In addition, a fastening plate 114 is disposed on the front face of the container 1 and a cover flap 21 is disposed on one side of the opening of the garage collection bag 2. A fastening belt 211 is disposed on inner face of the cover flap 21 and a fastening belt 22 is also disposed on the outer face of the garbage collection bag 2. The fastening belts 211, 22 can be attached to each other so as to secure the cover flap 21 to the garbage collection bag 2. A small bag body 23 is further disposed on the outer face of the garbage collection bag 2 to receive therein memo paper, correction liquid, a small knife, etc.

An independent mobile phone bag 3 is provided with the present invention. The phone bag 3 has an associated article bag 31 with pen holders 32 on the front face. A fastening plate 33 is disposed on the rear side of the mobile phone bag 3 for attaching to the fastening plate 114 so as to secure the mobile phone bag 3 to the container 1. According to another embodiment of the present invention, the mobile phone bag 3 is stitched to the main body of the article holder.

It is understood that the above description and drawings are only used for illustrating preferred embodiments of the present invention, and are not intended to limit the scope thereof. An variation and derivation from the above description and drawings are included in the scope of the present invention.

What is claimed is:

1. A multifunctional article holder comprising:

a main body including a facial tissue box container, a garbage collection bag, a mobile phone bag, and an article bag; the main body being disposed with fastening belts for securing the main body between two seats of a vehicle wherein;

said facial tissue box container is associated with said garbage collection bag, and said mobile phone bag and said article bag are independent bodies, said mobile phone bag and said article bag are removably attached to said facial tissue box container, a first cover flap is connected to an upper end of said facial tissue box container, and a second cover flap is connected to an upper end of said garbage collection bag, said cover flaps are secured by fastening belts to openings of said facial tissue box container and said garbage collection bag, said article bag includes a plurality of pen holders on an outer face, at least two latch clips and at least two extensible belts are disposed on an outer side of said main body, a water collection cup is disposed on one said extensible belt, such that one of said latch clips is adapted to receive a handle of an umbrella with a tip of said umbrella being received in said water collection cup to collect rain water, said latch clips are also adapted to receive other cups.

2. The article holder as claimed in claim 1 wherein;

a fastening belt is disposed on each extensible belt and a fastening belt is also disposed on an outer side of said water collection cup to detachably secure said water collection cup to said extensible belt.

3. The article holder as claimed in claim 1, wherein;

a fastening plate is disposed on a rear face of said mobile phone bag and a corresponding fastening plate is disposed on an outer side of said facial tissue box container so as to detachably secure said mobile phone bag to said facial tissue box container.

* * * * *